(12) United States Patent
Haneda et al.

(10) Patent No.: US 6,360,063 B1
(45) Date of Patent: Mar. 19, 2002

(54) IMAGE FORMING APPARATUS WHEREIN WRITING OF AN IMAGE IS CONDUCTED BEFORE FEEDING OF A TRANSFER MATERIAL IS STARTED

(75) Inventors: Satoshi Haneda; Kunio Shigeta; Yotaro Sato; Hisayoshi Nagase, all of Hachioji (JP)

(73) Assignee: Konica Corporation, Tokyo (JP)

( * ) Notice: Subject to any disclaimer, the term of this patent is extended or adjusted under 35 U.S.C. 154(b) by 0 days.

(21) Appl. No.: 09/610,294

(22) Filed: Jul. 5, 2000

(30) Foreign Application Priority Data

Jul. 9, 1999 (JP) .......................... 11-196656

(51) Int. Cl.7 .................... G03G 15/16; G03G 15/00
(52) U.S. Cl. .................... 399/18; 358/401; 399/309
(58) Field of Search ..................... 399/309, 17, 18, 399/19, 20, 394; 358/1.12, 1.14, 401

(56) References Cited

U.S. PATENT DOCUMENTS 4,714,939 A * 12/1987 Ahern et al. ............... 399/309
4,730,204 A * 3/1988 Satoh et al. ................. 399/17
5,920,744 A * 7/1999 Matsubara et al. ......... 399/19
6,204,932 B1 * 3/2001 Haneda et al. ......... 399/309 X

FOREIGN PATENT DOCUMENTS

| JP | 49-37538 B | 10/1974 |
| JP | 54-28740 B | 9/1979 |
| JP | 64-44457 | 2/1989 |
| JP | 4-214576 | 8/1992 |

\* cited by examiner

*Primary Examiner*—Joan Pendegrass
(74) *Attorney, Agent, or Firm*—Frishauf, Holtz, Goodman, Langer & Chick, P.C.

(57) ABSTRACT

In an image forming apparatus, in which toner images formed on an image forming body are formed on double sides of a transfer material, a writing of an image on the image forming body by a writing device according to image data for an intermediate transfer body is conducted before a feeding of the transfer material is started.

6 Claims, 11 Drawing Sheets

FIG. 6 (a)
READING
(SINGLE SIDED)  1   2   3   4   5   6
(DOUBLE SIDED)  1F  1R  2F  2R  3F  3R
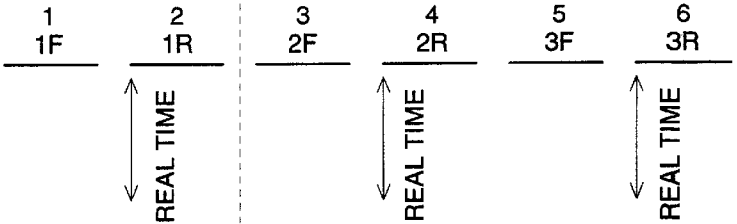
FIG. 6 (b)
WRITING
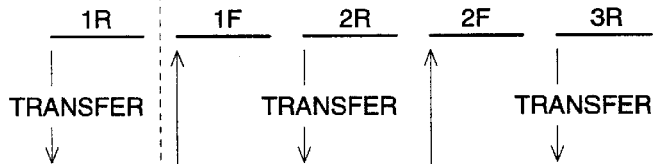
FIG. 6 (c)
IMAGE ON 14a
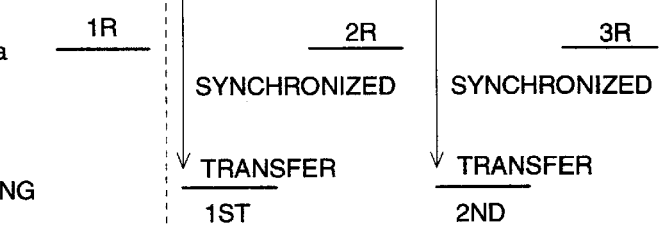
FIG. 6 (d)
SHEET FEEDING
↑
└─ IMAGE READING OF 1ST SHEET IS FINISHED
FIG. 7 (a)
READING
(SINGLE SIDED)  1   2   3   4   5   6
(DOUBLE SIDED)  1F  1R  2F  2R  3F  3R
FIG. 7 (b)
WRITING
FIG. 7 (c)
IMAGE ON 14a
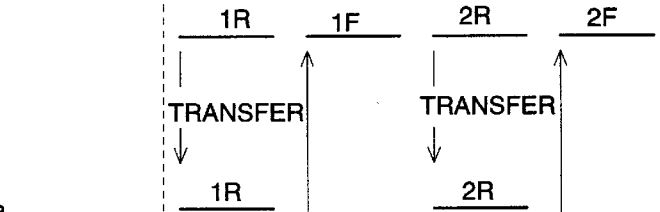
FIG. 7 (d)
SHEET FEEDING
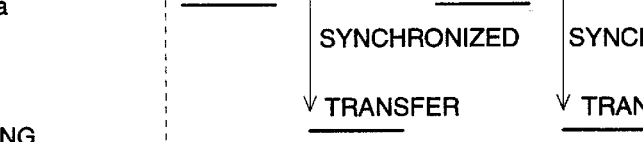
↑
└─ IMAGE READING OF 1ST SHEET IS FINISHED

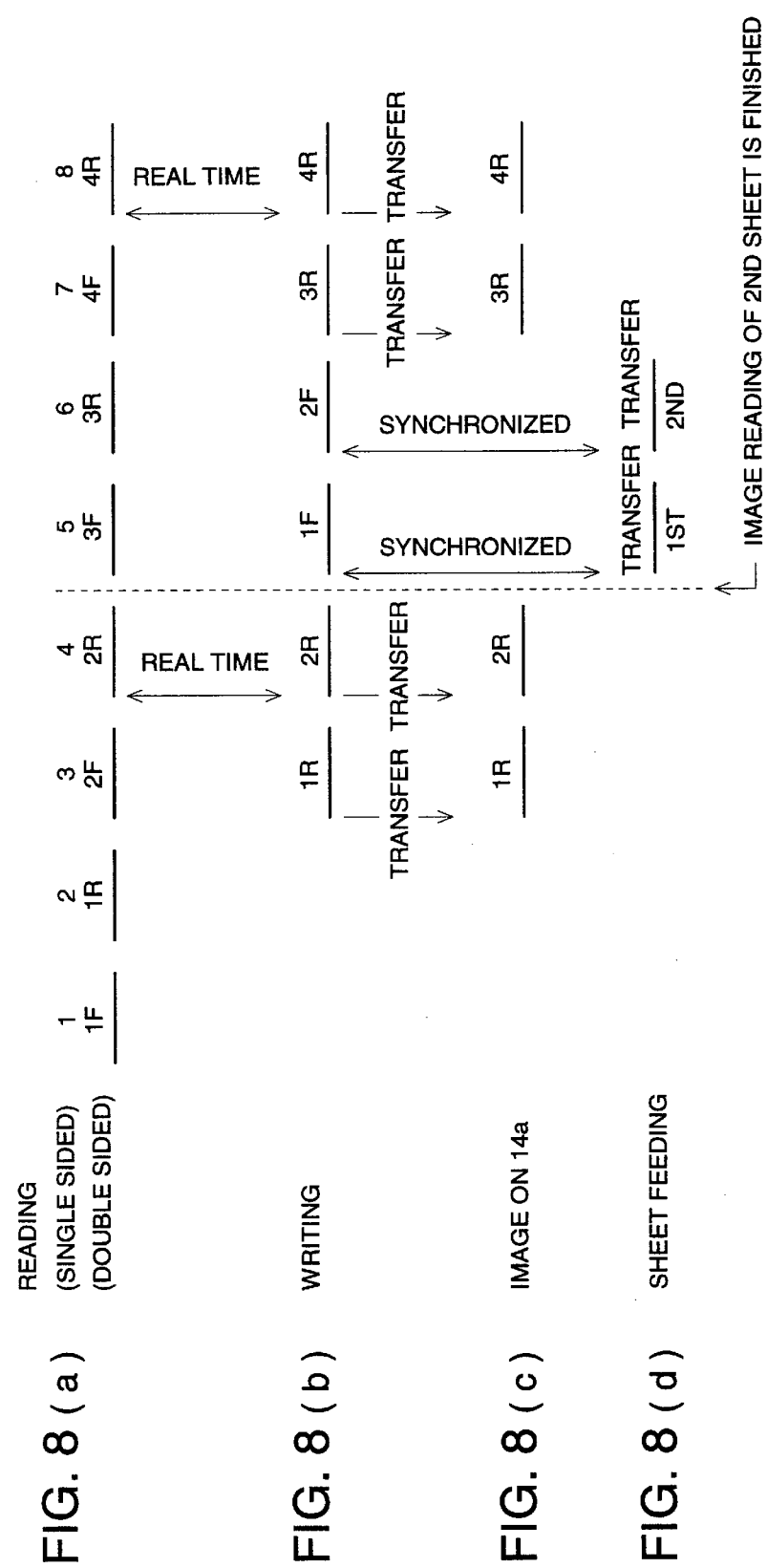

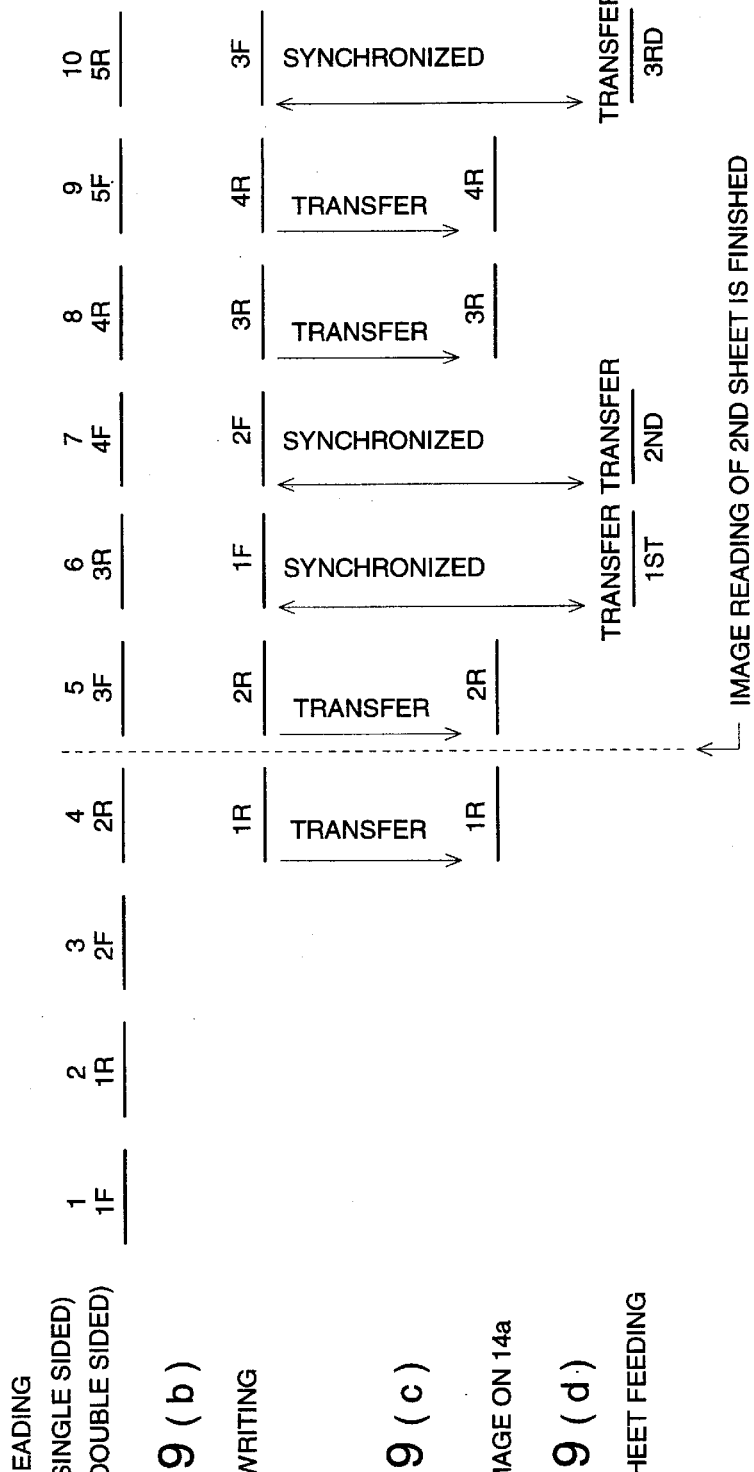

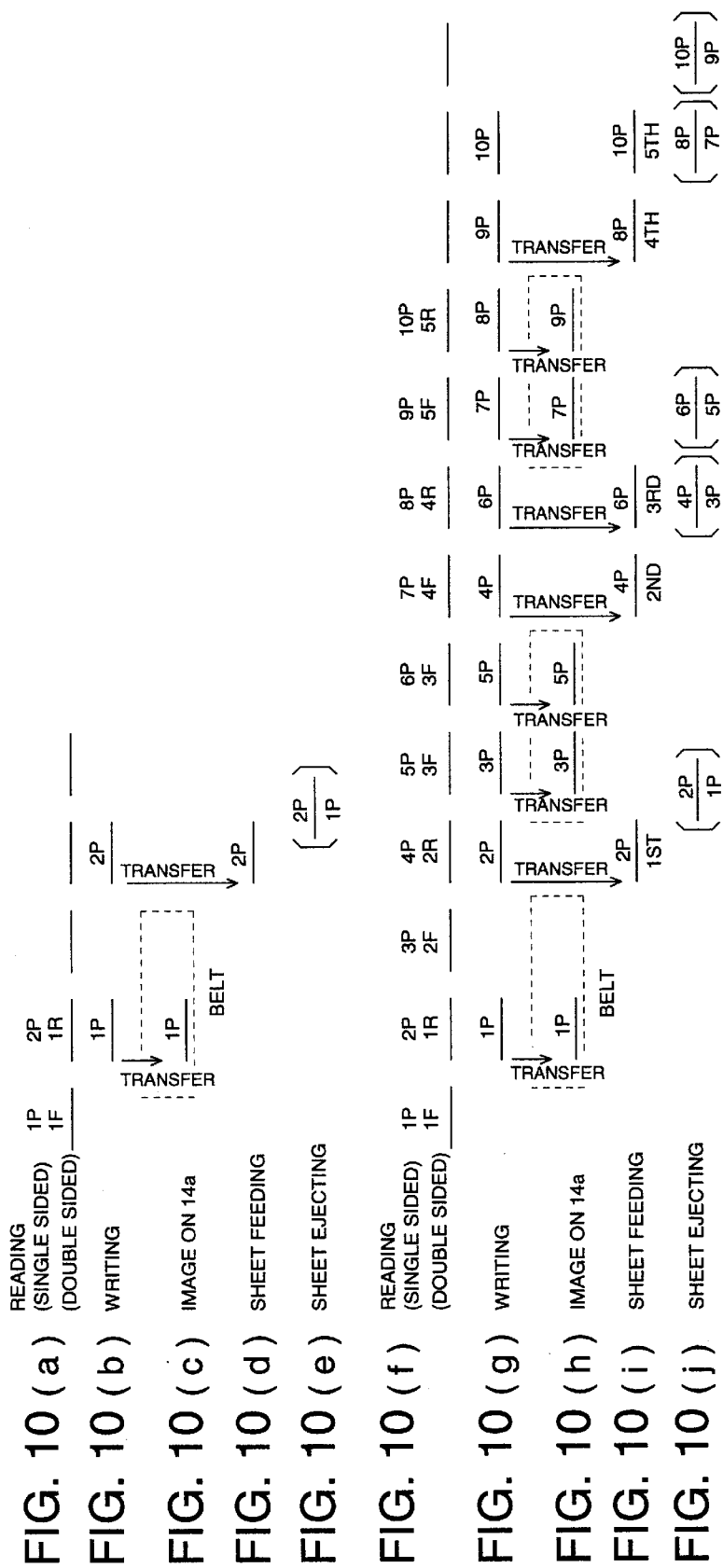

READING
(SINGLE SIDED)
(DOUBLE SIDED)

WRITING

SHEET FEEDING

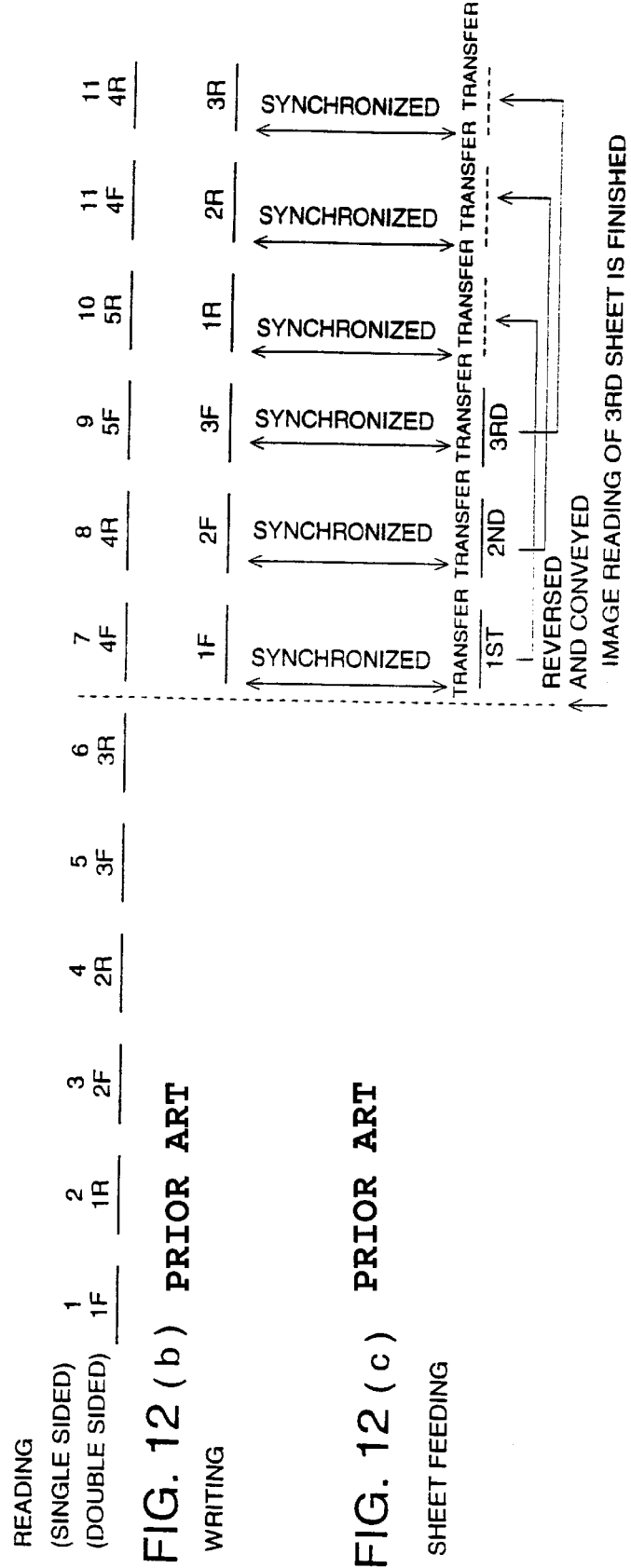

IMAGE FORMING APPARATUS WHEREIN WRITING OF AN IMAGE IS CONDUCTED BEFORE FEEDING OF A TRANSFER MATERIAL IS STARTED

BACKGROUND OF THE INVENTION

The present invention relates to an electrophotographic type image forming apparatus such as a copier, printer, and facsimile device, by which a toner image formed on an image forming body by a toner image forming means, is transferred onto a transfer material, fixed and an image is obtained, and in more detail, to an image forming apparatus by which toner images are formed on double sides of the transfer material through an intermediate transfer body, and color double sided images are obtained.

In the conventional double sided image forming apparatus, a method in which the one side image formed on the image forming body is transferred onto the transfer material, fixed and the transfer material is accommodated once in a double sided reversal feeding apparatus, and next, the transfer material is in timed relationship with another side image formed on the image forming body, and is fed from the double sided reversal feeding apparatus, and the image is transferred onto the other side of the transfer material and fixed, is adopted.

In this double sided image forming apparatus, because the conveyance of the transfer material is conducted such that, after the transfer material is accommodated once in the double sided reversal feeding apparatus, the transfer material is fed again, there is a problem that the conveyance distance of the transfer material becomes long, and it takes a long processing time for the double sided image formation. Further, because the transfer material which passes a fixing means once and is easily curled, is fed again, the reliability of the transfer material conveyance is low, thereby, it becomes a cause by which the jamming or wrinkle of the transfer material is caused.

In contrast to this, in Japanese Tokkosho Nos. 49-37538, 54-28740, Japanese Tokkaihei No. 1-44457, or Japanese Tokkaihei No. 4-214576, an image forming apparatus by which the toner images formed by the image forming body are transferred onto the double sides of the transfer material by using an intermediate transfer body, and the double sided image is obtained by one time fixing, and an image forming method are proposed.

Specifically, in Japanese Tokkaihei No. 1-44457, and Japanese Tokkaihei No 4-214576, a method, in which a plurality of the image forming means composed of the image forming body, charging means, imagewise exposure means, and cleaning means, are positioned in parallel on the intermediate transfer body in the order of yellow (Y), magenta (M), cyan (C) and black K), and the double sided copy of the color image is formed, is proposed.

In an image forming apparatus by which a color toner image is formed on the image forming body, and color toner images are formed on double sides of the transfer material through an intermediate transfer body, a plurality of developing devices in which each color toner of Y, M, C and K are accommodated, are provided, and all of developing devices in which each color toner of Y, M, C and K are accommodated, are operated, and toner images of the multi-colored color image are superimposed and formed on the image forming body, and transferred onto the transfer material, or onto the transfer material through the intermediate transfer body. On the one hand, in the case of the image formation of the mono-color, for example, one color of black, only the developing device in which black (K) toner is accommodated, is operated, and one color toner image of black is formed on the image carrier, and transferred onto the transfer material, or onto the transfer material through the intermediate transfer body.

The rear side image formed on the image forming body is transferred onto the intermediate transfer body (primary transfer A). Next, the front side image formed on the image forming body is transferred onto the front side of the transfer material conveyed in timed relationship with the intermediate transfer body (primary transfer B). Further, when the transfer bias voltage is applied onto the transfer material on the front side of which the front side image is held, from above, the rear side image on the intermediate transfer body is transferred onto the rear side of the transfer material (secondary transfer). In this manner, the transfer material on double sides of which the toner images are held, is adhered onto the intermediate transfer body and conveyed, and the separation bias voltage for separation discharging is applied thereon and the transfer material is separated from the intermediate transfer body, and conveyed to the fixing apparatus. In the fixing apparatus, the bias voltage is applied between fixing members (fixing rollers) for nipping and fixing, and fixing without toner disturbance is conducted.

In the image formation, when the image reading or image transmission are carried out, a miss often occurs in the initial period of these operations. For example, reading error caused by jam of document occurs. In the image formation, in the case where the feeding of the transfer sheet is conducted at the same time as the start of the image reading, or as the start of the image transmission, when the miss occurs, the operation is stopped, and the conveyance of the transfer sheet is stopped during the sheet feeding, and in this case, it is necessary that the transfer sheet stopped during the sheet feeding, is taken out as a jammed sheet from the conveyance path of the transfer sheet before the next operation. For clearing the jammed sheet from the conveyance path, a long period of time is necessary for clearing, and further, there is a case in which the surface of the photoreceptor which is the image forming body, is damaged, and the actuator of the sensor provided on the conveyance path is damaged. Furthermore, a lot of transfer sheets are wasted uselessly.

On the one hand, when the sheet feeding is started after the image reading is finished, or after the image transmission is finished, the printing time period from the time of the start of the image reading to the time in which the image is formed on the transfer sheet and the transfer sheet is delivered, becomes long, and the image processing performance is not satisfactory.

COMPARATIVE EXAMPLE

In the case of the conventionally known double sided image forming apparatus shown by the conceptual view in FIG. 13, in which the single side (front side) image is formed on the transfer material and is fixed, and after that, the transfer material is fed to the transfer area though the reversal sheet feeding path, and the rear side image is transferred onto the opposite side of the transfer material, and is fixed and the transfer material is delivered, it would be considered to start the feeding of the transfer material after finishing all reading procedure of the initial double sided image.

FIGS. 11(*a*)–11(*c*) and FIGS. 12(*a*)–12(*c*) are illustrations showing the operation sequence in which, after the reading of the image data of the initial group, and transmission are completed, the feeding of the transfer material is started, in the double sided image forming apparatus shown in FIG. 13. FIGS. 11(a)–11(c) are case where the apparatus has a capacity (length) enough to move the transfer material with an interval which is equivalent to two sheets of A-3 sized transfer material in the reversal sheet feeding path, and the double sided images of the A-3 size are formed, and two sheets are one group, and after the reading (FIG. 11(a)) of the document image of the (1-front), (1-rear), (2-front), and (2-rear) and transfer are completed, the (1-front) image is read from the image storing section (FIG. 11(b)), and the image formation is conducted, and synchronously with that, the feeding of the first sheet (FIG. 11(c)) is conducted. Further, FIGS. 12(a)–12(c) are case where the apparatus has a capacity (length) enough to move the transfer material with an interval which is equivalent to three sheets of A-4 sized transfer material in the reversal sheet feeding path, and the double sided images of the A-4 size are formed, and three sheets are one group, and after the reading (FIG. 12(a)) of the document image of the (1-front), (1-rear), (2-front), (2-rear), (3-front), (3-rear), and transmission are completed, the (1-front) image is read from the image storing section (FIG. 12(b)), and the image formation is conducted, and synchronously with that, the feeding of the first sheet (FIG. 12(c)) is conducted.

As described above, when the sheet feeding is started after the completion of the reading of the document image of one group, even when there is a miss of the initial image reading, because the sheet feeding is not conducted, thereby, the sheet feeding jam is not caused. However, as clearly be seen from FIGS. 11(a)–11(c), and FIGS. 12(a)–12(c), in the double sided image forming apparatus which does not have the intermediate transfer body, but has the reversal path shown in FIG. 13, the time period in which the image is formed on double sides of the first sheet of the transfer material, and the transfer material is delivered onto the delivery tray, is very longer.

On the other hand, because this system needs synchronization between writing image and feeding the transfer material, if the transfer materials are fed with writing procedure before finishing reading procedure for initial document, the system cannot avoid risk that transfer materials are jammed with reaction for reading miss.

OBJECT OF THE INVENTION

In an image forming apparatus by which toner images are formed on double sides of a transfer material through an intermediate transfer body, an object of the present invention is to provide an image forming apparatus in which the processing time required for the printing is not long, and even when a miss which is easily generated at an initial period of the image reading or the image transmission occurs, jam clearing is not necessary at each time.

The above object can be attained by any one of the following structures (1) to (4).

(1) An image forming apparatus in which toner images formed on an image forming body are formed on double sides of a transfer material, the image forming apparatus comprising: reading means for reading image data of original documents; writing means for writing an image on the image forming body according to the image data; feeding means for feeding the transfer material; and an intermediate transfer body, wherein the writing means writes the image for the intermediate transfer body before the feeding means starts to feed the transfer material.

(2) An image forming apparatus, in which toner images formed on an image forming body are formed on double sides of a transfer material, the image forming apparatus comprising: reading means for reading image data of original documents; writing means for writing an image on the image forming body according to the image data; feeding means for feeding the transfer material; and an intermediate transfer body, wherein when the images of n pages can be accommodated on the intermediate transfer body, the feeding means starts to feed the transfer material after the reading means finishes to read the image data of 2n pages, and the writing means starts to write the image data before the reading means finishes to read the image data of 2n pages.

(3) An image forming apparatus in which toner images formed on an image forming body are formed on double sides of a transfer material, the image forming apparatus comprising: reading means for reading image data of original documents; writing means for writing an image on the image forming body according to the image data; feeding means for feeding the transfer material; and an intermediate transfer body, wherein the transmission means transmits the image data in synchronization with a writing by the writing means according to the image data, and the feeding means starts to feed the transfer material after the writing means finishes to write the image data through the intermediate transfer body.

(4) An image forming apparatus in which toner images formed on an image forming body are formed on double sides of a transfer material, the image forming apparatus comprising: reading means.for reading image data of original documents; writing means for writing an image on the image forming body according to the image data; feeding means for feeding the transfer material; and an intermediate transfer body, wherein the transmission means transmits the image data not in synchronization with a writing by the writing means according to the image data, and the feeding means starts to feed the transfer material after the writing means finishes to write the image data through the intermediate transfer body.

BRIEF DESCRIPTION OF THE DRAWINGS

FIG. 6(a) to FIG. 6(d) are illustrations showing the relationship among the image reading, image writing, and sheet feeding in embodiment 1.

FIG. 7(a) to FIG. 7(d) are illustrations showing the relationship among the image reading, image writing, and sheet feeding in embodiment 2.

FIG. 8(a) to FIG. 8(d) are illustrations showing the relationship among the image reading, image writing, and sheet feeding in embodiment 3.

FIG. 9(a) to FIG. 9(d) are illustrations showing the relationship among the image reading, image writing, and sheet feeding in embodiment 4.

FIG. 10(a) to FIG. 10(j) are illustrations showing the relationship among the image reading, image writing, and sheet feeding in embodiment 5.

FIG. 12(a) to FIG. 12(c) are illustrations showing the relationship among the image reading, image writing, and sheet feeding of another comparative example.

DETAILED DESCRIPTION OF THE PREFERRED EMBODIMENT

Before the description of the present invention, an embodiment common to an image forming apparatus to which each invention is applied, will be described below. Incidentally, the present invention is not limited to the following embodiments. Further, the description herein is not intended to limit the technical scope or the meaning of terms used in the claims. Further, in the description of the following embodiments, when the color toner image is transferred onto the transfer material, the surface of the transfer material opposing the image carrier in the transfer area is called the front side, and the other side surface, that is, the surface opposing the intermediate transfer body is called the rear side, and the image transferred onto the front side of the transfer material is called the front side image, and the image transferred onto the rear side of the transfer material is called the rear side image.

Figure 1:
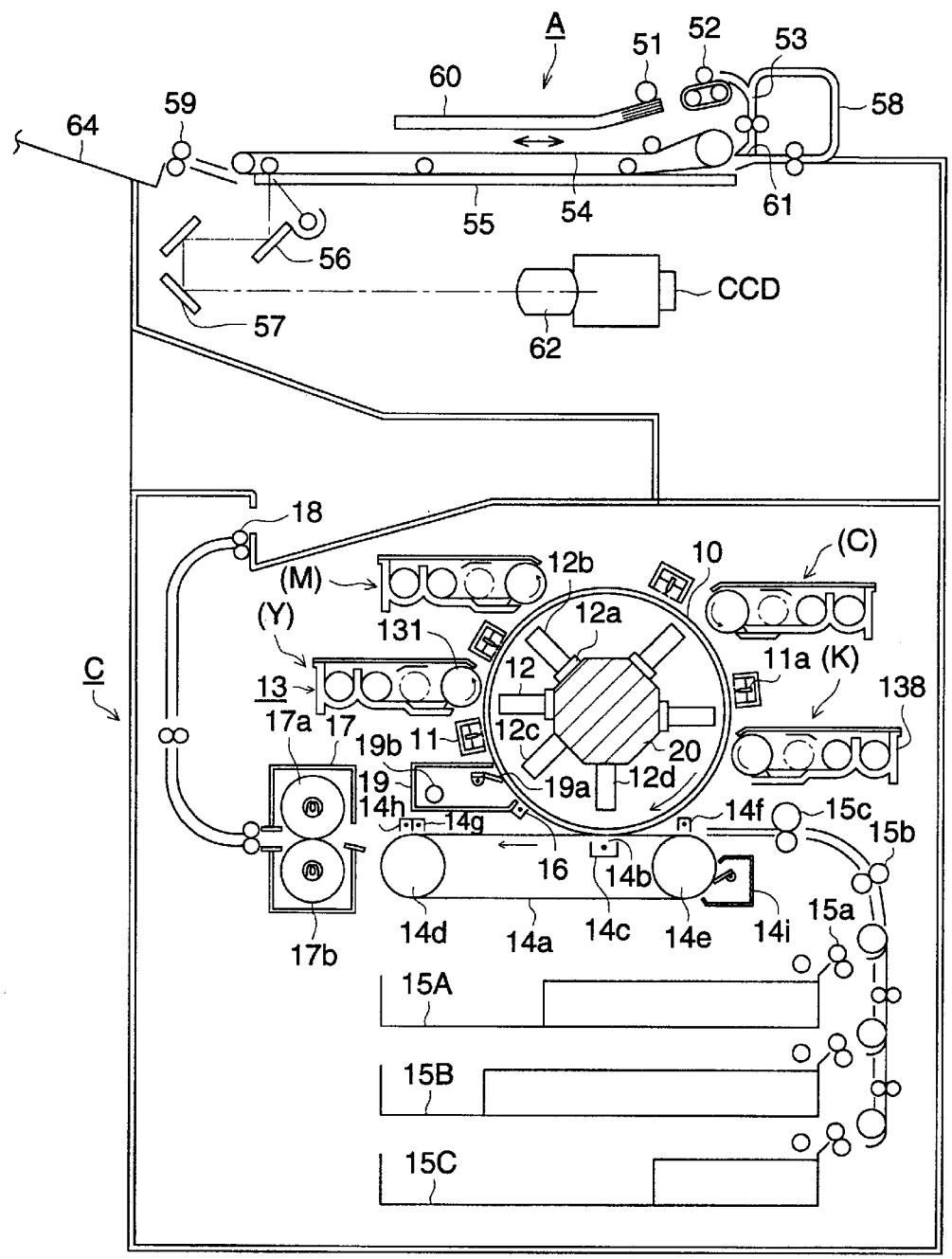
FIG. 1 is a structural sectional view of an image forming apparatus of the present invention.
Figure 2:
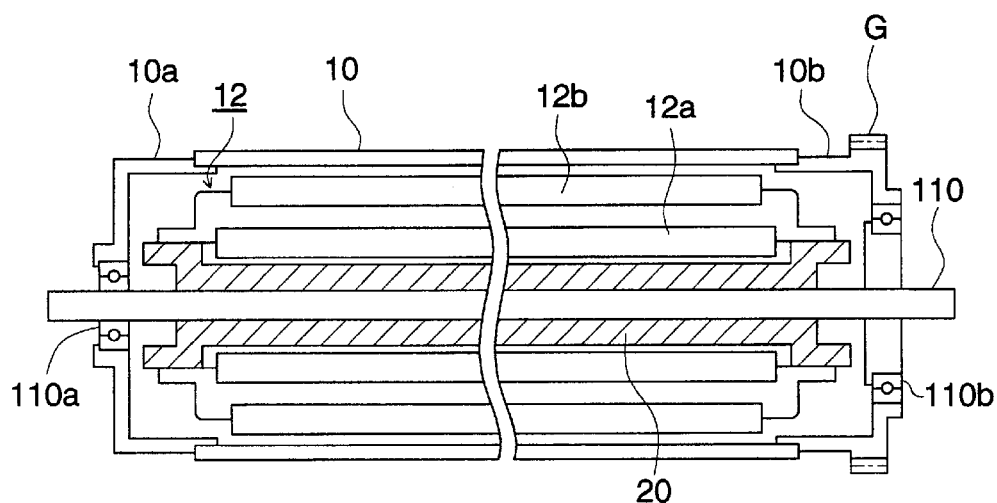
FIG. 2 is a side sectional view of an image forming body.
Figure 3:
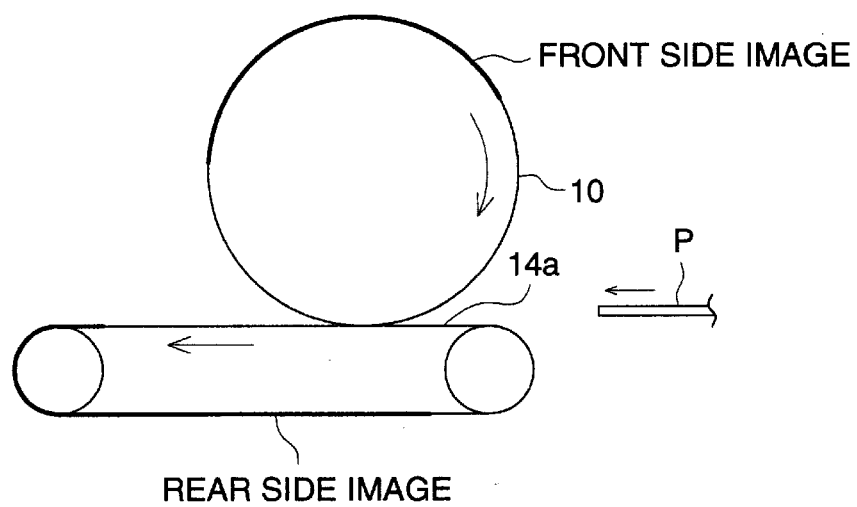
FIG. 3 is an illustration showing a forming condition of a toner image.

Referring to FIG. 1 to FIG. 3, an image forming process and each mechanism of the embodiment of the image forming apparatus of the present invention will be described below. FIG. 1 is a structural sectional view of a color image forming apparatus showing an embodiment of the present invention, FIG. 2 is a side sectional view of an image carrier of FIG. 1, and FIG. 3 is a view showing a toner image forming condition and the supply of the transfer material according to the embodiment.

FIG. 1 is a view showing the overall structure of the hardware in the color image forming apparatus according to the digital system by which the double sided image formation can be attained, however, the present invention is not limited to the image forming apparatus by which the color images can be formed onto double sides of transfer material, but the monochromatic digital copier which can conduct the double sided image formation, may also be allowable.

In FIG. 1, the color image forming apparatus is composed of an image reading section A, image processing section B (not shown), image forming section C, and the image reading section A corresponds to an image reading means, the image processing section B corresponds to an image processing means, and the image forming section C corresponding to an image forming means.

The image reading section A can conduct the reading of the image recorded on the double sides or one side (front side), and in the image reading section A, a document 60 is stacked with the front side facing upward, in the order of the page from the up side, and by the operation of a conveyance belt 51 and a handling roller 52, the document 60 of the uppermost layer is conveyed toward the conveyance path 53. The conveyed document 60 switches a forced guide plate 61, and more backwardly. Then the document is fed onto a platen glass 55 formed of a transparent body through a conveyance belt 54, and temporarily stopped at a document reading position with the front side facing downward.

The front side image of the document 60 on the platen glass 55 is read by a reading operation by the speed of the first mirror unit 56, and by the moving exposure by the speed V/2 in the same direction by the second mirror unit, in the first mirror unit composed of an illumination lamp and the first mirror, and the second mirror unit composed of the second mirror and the third mirror which are positioned in the V-shape, in which these units structure the scanning optical system, and the image is formed on the light receiving surface of the image pick-up elements CCDs which are three line sensors, through a projecting lens 62. After color separation, the line-like optical image formed on the image pick-up elements CCDs is successively photoelectric-converted into an electric signal (brightness signal).

In the image reading section A, when the reading of the front side image is completed, the front and rear sides of the document 60 is reversed by the temporary reversal rotation of the conveyance belt 54 through the reversing feed path 58, and the document 60 is fed again onto the platen glass 55 through the conveyance path 53 by the conveyance belt 54, and is temporarily stopped at the document reading position with the rear side facing downward.

The rear side image of the document 60 on the platen glass 55 is read by the scanning optical system, color-separated and photoelectric-converted into the electric signal by the image pick-up element CCD.

The document 60 whose image reading is completed on the platen glass 55 is delivered onto a tray 64 by the operation of the conveyance belt 54 through a sheet delivery roller 59 in such a manner that the delivered document 60 is stacked with the front side facing downward in the order of the pages from the down side.

The image signal (image data) of the document image read out by the image reading section A is processed by each kind of processing such as the density conversion, filtering, variable magnification processing, γ-correction, and front/rear side image correction processing, in the image processing section B, which will be described later, and after that, outputted to the image forming section C.

The image forming section C forms an image on the recording sheet by the laser printer using the electrophotographic technology corresponding to the inputted image signal.

In the image forming section C, numeral 10 is a photoreceptor drum which is the image forming body, numeral 11 is a scorotron charger which is a charging means for each color, numeral 12 is an exposure unit which is an image exposure means for each color, numeral 13 is a developing device which is a developing means for each color, numeral 14a is an intermediate transfer body, numeral 14c is the primary transfer device which is the first transfer means, numeral 14g is the secondary transfer device which is the second transfer means, numeral 15c is a timing roller which is a transfer material supplying means, and numeral 17 is a fixing apparatus which is a fixing means.

The photoreceptor drum 10 which is the image forming body, is formed in such a manner that the photoreceptor layer such as a transparent conductive layer, a-Si layer, or organic photoreceptor layer (OPC), is formed on the outer periphery of the cylindrical base body formed of a transparent member such as the optical glass or the transparent acrylic resin, and is rotated clockwise shown by the arrow in FIG. 1.

As shown in FIG. 2, the photoreceptor drum 10 is rotated in a predetermined direction at the constant speed, when the flange members 10a and 10b of both surface ends fix the photoreceptor drum 10 by engaging with it, and the drum shaft 110 fixed on the apparatus main body is born by the bearings 110a and 110b which are inserted into the flange members 10a and 10b of both ends, and rotatably supported, and the gear G which is integrated with the flange member 10b is engaged with the driving gear of the apparatus main body side and driven.

The scorotron charger 11 which is the charging means for each color, exposure unit 12 which is the image exposure means for each color, and developing device 13 which is the developing means for each color are set as one group, and four groups are provided for the image forming process of each color of yellow (Y), magenta (M), cyan (C) and black (K), and are arranged in the order of Y, M, C and K in the rotation direction of the photoreceptor drum 10 shown by an arrow in FIG. 1.

The scorotron charger 11 serving as the charging means for each color is mounted opposed to the photoreceptor drum 10 in the perpendicular direction to the moving direction of the photoreceptor drum 10, and has a control grid which is held at the predetermined potential to the photoreceptor layer of the photoreceptor drum 10, and for example, a discharging electrode 11a composed of a sawtoothed electrode, and conducts charging operation (in the present embodiment, negative charging) by the corona discharging with the same polarity as the toner and applies the uniform potential onto the photoreceptor drum 10. As the discharging electrode 11a, a wire electrode may be used other than that.

The exposure unit 12 serving as the image exposure means for each color is arranged inside the photoreceptor drum 10 in such a manner that the exposure position on the photoreceptor drum 10 is positioned at the downstream side of the rotation direction of the photoreceptor drum 10 to the scorotron charger 11 for each color. The exposure unit 12 is composed of: a linear light emitting element 12a in which a plurality of LEDs (light emitting diodes) as light emitting elements arranged in the primary scanning direction in parallel to the shaft of the photoreceptor drum 10, are aligned array-like; and a holder (not shown) onto which a selfoc lens 12b as a life-sized image forming element is attached. A uniform exposure device 12c and a transfer simultaneous exposure device 12d other than the exposure unit 12 for each color, are attached to the holding member 20, and are integrated with each other and accommodated inside the base body of the photoreceptor drum 10. The image data read out by the image reading section A or the image data for each color stored in the memory is successively read out and image-processed, and respectively inputted into the exposure unit 12 for each color as the electric signal. As the light emitting element, other than the above, a unit in which a plurality of light emitting elements such as FL (fluorescent material light emission element), EL (electro-luminescence element), or PL (plasma discharge element) are aligned array-like, is used. As the light emission wavelength of the light emitting element used in the present embodiment, normally, the wavelength within the range of 680–900 nm, in which normally the permeability is high to the Y, M, C toner, is desirable, however, because the image exposure is conducted from the inside (rear surface) of the photoreceptor drum 10, the shorter wavelength whose transparency is insufficient for the color toner, may also be allowed.

The developing device 13 as the developing means for each color has a developing sleeve 131 formed of, for example, 0.5–1 mm thick, and 15–25 mm outer diameter cylindrical non-magnetic stainless steel or aluminum material, which has a predetermined gap to the peripheral surface of the photoreceptor drum 10 and is rotated in the direction opposite to the rotation direction of the photoreceptor drum 10, and a development casing 138, and one component or two-component developer of yellow (Y), magenta (M), cyan (C), and black (K) is accommodated therein. Each developing device 13 has a predetermined gap, for example, 100–1000 μm from the photoreceptor drum 10 by a roller (not shown) and is kept non-contact with the photoreceptor drum 10, and when the development bias voltage in which the DC voltage with the same polarity (in the present embodiment, negative polarity) as toner, and the AC voltage are superimposed on each other, is applied onto the developing sleeve 131, the non-contact reversal development is conducted, and the toner image is formed on the photoreceptor drum 10.

The intermediate transfer body 14a is an endless belt having the volume resistivity $10^8$–$10^{12}$ Ω·cm, and the two-layer construction seamless belt, in which preferably as the toner filming prevention layer, 5–50 μm thick fluorine coating is conducted on the outside of 0.5–2.0 mm non-conductive rubber belt base body in which the conductive material is dispersed in, for example, silicon rubber or urethane rubber. As the base body of the belt, other than this, 0.1–1.0 mm thick semi-conductive film in which the conductive material is dispersed in the engineering plastic such as the modified polyimide, thermohardening polyimide, ethylene tetrafluoroethylene copolymer, polyvinylidene fluoride, or nylon alloy, may also be used. The intermediate transfer body 14a is stretched by being inscribed with a drive roller 14d and a driven roller 14e, and is rotated in the counterclockwise direction shown by an arrow in FIG. 1.

Primary transfer device 14c as the first transfer means is provided opposed to the photoreceptor drum 10 with the intermediate transfer body 14a between them, and a transfer area is formed between the intermediate transfer body 14a and the photoreceptor drum 10. The DC voltage with the reverse polarity to the toner (in the present embodiment, positive polarity) is applied onto the primary transfer device 14c, and by forming the transfer electric field in the transfer area 14b, the toner image on the photoreceptor drum 10 is transferred onto the intermediate transfer body 14a or the front side of the recording sheet P which is a transfer material.

The secondary transfer device 14g as the second transfer means is provided opposite to the conductive roller 14j which is electrically grounded with the intermediate transfer body 14a between them, and the DC voltage with the reverse polarity to the toner (in the present embodiment, positive polarity) is applied and the toner image on the intermediate transfer body 14a is transferred onto the rear side of the recording sheet P.

The timing roller 15c which is the transfer material supply means is in timed relationship with the color toner image of the front side image on the photoreceptor drum 10, or the color toner image of the rear side image on the intermediate transfer body 14a, and feeds the recording sheet P which is the transfer material to the transfer area 14b.

The paper separation AC discharger 14h which is the transfer material separation means is preferably composed of the corona discharger, and is provided opposite to the drive roller 14d which is electrically grounded with the intermediate transfer belt 14a between them, at the end portion of the fixing apparatus 17 side of the intermediate transfer belt 14a, and the AC voltage on which the DC voltage with the same polarity as the DC voltage applying onto the secondary transfer device 14g (in the present embodiment, positive polarity), is superimposed, is applied thereon, and the recording sheet P conveyed from the intermediate transfer belt 14a is discharged, and separated from the intermediate transfer belt 14a.

The fixing apparatus 17 as the fixing means has two roller-like fixing member of the first fixing roller 17a having a heater therein, and the second fixing roller 17b, and by applying the heat and pressure between the first fixing roller 17a and the second fixing roller 17b, the toner image on the recording sheet is fixed.

Next, the image forming process will be described.

When the image recording starts, the image data of the document image read out by the image pick-up element in the image reading section A or the image data edited by the computer is processed in the image processing section B as the image signal for each color of y (yellow), M (magenta), C (cyan), and K (black).

By the start of the image recording, by the start of the photoreceptor drive motor, not shown, the gear G provided on the far side flange 10b of the photoreceptor drum 10 is rotated through a gear for driving, not shown, and the photoreceptor drum 10 is rotated clockwise as shown by the arrow in FIG. 1, and simultaneously, the application of the potential is started onto the photoreceptor drum 10 by the charging action of the scorotron charger 11 of yellow (Y).

After the application of the potential onto the photoreceptor drum 10, the exposure by the electric signal corresponding to the first color signal, that is, the image data of Y is started in the Y exposure unit 12, and by the rotational scanning of the photoreceptor drum 10, an electrostatic latent image corresponding to the image of Y of the document image is formed on the photoreceptor layer of the surface of the photoreceptor drum 10.

The latent image is reversal-developed in the non-contact condition by the Y developing device 13, and the yellow (Y) toner image is formed corresponding to the rotation of the photoreceptor drum 10.

Next, the potential is applied onto the photoreceptor drum 10 from above the toner image of the yellow (Y) by the charging action of the scorotron charger 11 of magenta (M), and the exposure by the electric signal corresponding to the second color signal of the exposure unit 12 of M, that is, the image data of M, is conducted, and by the non-contact reversal development by the M developing device 13, the toner image of magenta (M) is formed by being superimposed on the toner image of yellow (Y).

In the same process, the toner image of cyan (C) corresponding to the third color signal is further formed by being superimposed by the scorotron charger 11 of cyan (C), the exposure unit 12 of C, and developing device 13 of C, and further the toner image of black (K) corresponding to the fourth color signal is formed by successively being superimposed on the above toner images by the scorotron charger11 of black (K), the exposure unit 12 of K, and developing device 13 of K, and the toner image of color is formed on the peripheral surface of the photoreceptor drum 10 within one rotation of the photoreceptor drum 10.

The exposure onto the photoreceptor layer of the photoreceptor drum 10 by these Y, M, C and K exposure units 12 is conducted from the inside of the photoreceptor drum 10 through the transparent base body. Accordingly, the exposure of the images corresponding to the second, the third, and the fourth color signals is respectively conducted absolutely without being influenced by the previously formed toner image, and the electrostatic latent image which is equivalent to the image corresponding to the first color signal, can be formed.

By the above image forming process, the superimposed color toner image which is the rear side image, is formed on the photoreceptor drum 10 which is the image carrier, and this superimposed color toner image of the rear side image on the photoreceptor drum 10 is collectively transferred onto the intermediate transfer body 14a (primary transfer A) in the transfer area 14b by the primary transfer device 14c onto which the DC voltage of 4–6 kV, with the reverse polarity as the toner (in the present embodiment, positive polarity) is applied. In this case, the uniform exposure by the transfer simultaneous exposure device 12d using, for example, the light emitting diode, is conducted so that fine transfer can be conducted.

After the toner remained on the peripheral surface of the photoreceptor drum 10 after transferring, is discharged by the photoreceptor drum AC discharger 16, it comes to the cleaning apparatus 19, and cleaned by a cleaning blade 19a composed of the rubber member in contact with the photoreceptor drum 10, and further, in order to eliminate the hysteresis of the photoreceptor up to the print, the peripheral surface of the photoreceptor is discharged by the exposure by the pre-charge uniform exposure device 12c, using, for example; light emitting diode, and the charge at the time of the previous printing, is removed and the following color image formation is conducted.

As described above, after the superimposed color toner images, which are the rear side image, are formed on the intermediate transfer body 14a, successively, in the same manner as the above color image forming process, the superimposed color toner image, which is the front side image, is formed on the photoreceptor drum 10, being in timed relationship with the rear side image on the intermediate transfer body 14a in the transfer area 14b. Incidentally, the image data is changed (which will be described later), so that the front side image formed in this case, and the rear side image are the mirror image to each other, on the photoreceptor drum 10.

Further, the recording sheet P which is the transfer material, is sent from the feeding cassette 15 which is the transfer material accommodation means, by the send roller 15a, and fed by the feeding roller 15b and conveyed to the timing roller 15c.

The. recording sheet P is fed to the transfer area 14b in such a manner that the color toner image of the front side image formed on the photoreceptor drum 10 is in timed relationship with the color toner image of the rear side image carried on the intermediate transfer body 14a by the drive of the timing roller 15c which is the transfer material supply means. In this case, the toner image forming condition of the rear side image carried on the intermediate transfer body 14a and the front side image formed on the photoreceptor drum 10, and the recording sheet P fed being in timed relationship with these, are shown in FIG. 3.

When the recording sheet P is fed to the transfer area 14b, the recording sheet P is paper-charged such that the DC voltage of 4–6 kV, whose polarity is the same as the toner, is applied onto the recording sheet P and the recording sheet P is paper-charged, by a paper charger 14f as a transfer material charging means which can contact with and contact-release from the intermediate transfer body 14a, and the recording sheet P is attracted to the intermediate transfer body 14a, and fed to the transfer are 14b. When the paper charge is conducted with the same polarity as toner, it is prevented that the recording sheet P, and the toner image on the intermediate transfer body 14a, or the toner image on the photoreceptor drum 10, are attracted to each other, thereby, the toner image is prevented from being disturbed. Further, as the transfer material charging means, a conductive roller which can contact with and contact-release from the intermediate transfer body 14a, or a corona discharger which is non-contact with the intermediate transfer body 14a, may be used.

In the transfer area 14b, by the primary transfer device 14c as the first transfer means onto which the DC voltage of 4–6 kV, whose polarity is the reverse polarity to the toner (in the present embodiment, positive polarity), is applied, the front side image on the peripheral surface on the photoreceptor drum 10 is collectively transferred onto the front side (upper surface) of the recording sheet P (primary transferring B). In this case, the rear side image on the peripheral surface of the intermediate transfer body 14a is not transferred onto the recording sheet P, and exists on the intermediate transfer body 14a.

The recording sheet P onto whose front side the color toner image is transferred, is, next, conveyed to the secondary transfer device 14g as the second transfer means onto which the DC voltage of 4–6 kV whose polarity is the reversal polarity to the toner (in the present embodiment, positive polarity) is applied, and by the secondary transfer device 14g, the rear side image on the peripheral surface of the intermediate transfer body 14a is collectively transferred onto the rear side (lower surface) of the recording sheet P (secondary transferring).

Because the toner image of each color is superimposed with each other, in order to enable the collective transferring, it is preferable that the upper layer toner and lower layer toner of the toner layer are charged with the same charging amount and with the same polarity. According to this, in the double sided image formation in which the color toner image formed on the intermediate transfer body 14a is subjected to the polarity reversing by the corona charging, or the color toner image formed on the photoreceptor drum 10 is subjected to the polarity reversing by the corona charging, because the lower layer toner is not sufficiently charged to the same polarity, the transferring becomes poor, therefore, it is not preferable.

When the reversal development is repeated on the photoreceptor drum 10, and the color toner images with the same polarity, formed by being superimposed, are collectively transferred onto the intermediate transfer body 14a without changing the polarity, and next, collectively transferred onto the recording sheet P without changing the polarity, it contributes to the increase of transferability of the rear side image formation, therefore, it is preferable. Also for the front side image formation, when the reversal development is repeated on the photoreceptor drum 10, and the color toner images with the same polarity, formed by being superimposed, are collectively transferred onto the recording sheet P without changing the polarity, it contributes to the increase of transferability of the front side image formation, therefore, it is preferable.

From the above description, in the color image formation, the double sided image forming method in which the first transfer means and the second transfer means are separately provided, and the first transfer means is operated and the color toner image is formed on the front side of the transfer material, and next, the second transfer means is operated and the color toner image is formed on the rear side of the transfer material, is preferably adopted.

The recording sheet P which is the transfer material, on double sides of which the color toner images are formed, is discharged by the paper separation AC discharger 14h onto which the voltage in which the DC voltage and the AC voltage are superimposed, is applied for transfer material separation, and separated from the intermediate transfer body 14a (separation discharge), and conveyed to the fixing apparatus 30 as the fixing means structured by two fixing rollers having a heating means (heater) inside both upper and lower rollers. The recording sheet P is subjected to the heat and pressure between the first upper fixing roller 310 and the second lower fixing roller 320, and the bias voltage is applied between fixing rollers, thereby, the adhered toner of the front and rear sides of the recording sheet P is fixed, and the recording sheet P on double sides of which images are recorded, is sent by the sheet delivery roller 18, and delivered onto the tray of the outside of the apparatus.

The toner remained on the peripheral surface of the intermediate transfer body 14a after transferring, is cleaned by the blade which is provided in the intermediate transfer body cleaning apparatus 14i which is a cleaning means for the intermediate transfer body, and which can contact with and contact-release from the intermediate transfer body 14a. Further, the toner remained on the peripheral surface of the photoreceptor drum 10 after transferring, is discharged by an image forming body AC discharger 16, and after that, comes to the cleaning apparatus 19, and scraped off into the cleaning apparatus 19, by the cleaning blade 19a formed of rubber material in contact with the photoreceptor drum 10, and is collected into a waste toner container, not shown, by a screw 19b. The peripheral surface of the photoreceptor drum 10 from which the remained toner is removed by the cleaning apparatus 19, is discharged by the exposure by the uniform exposure device 12c, and after that, the photoreceptor drum 10 is uniformly charged by the Y scorotron charger 11, and enters into the next image forming cycle.

Figure 4:
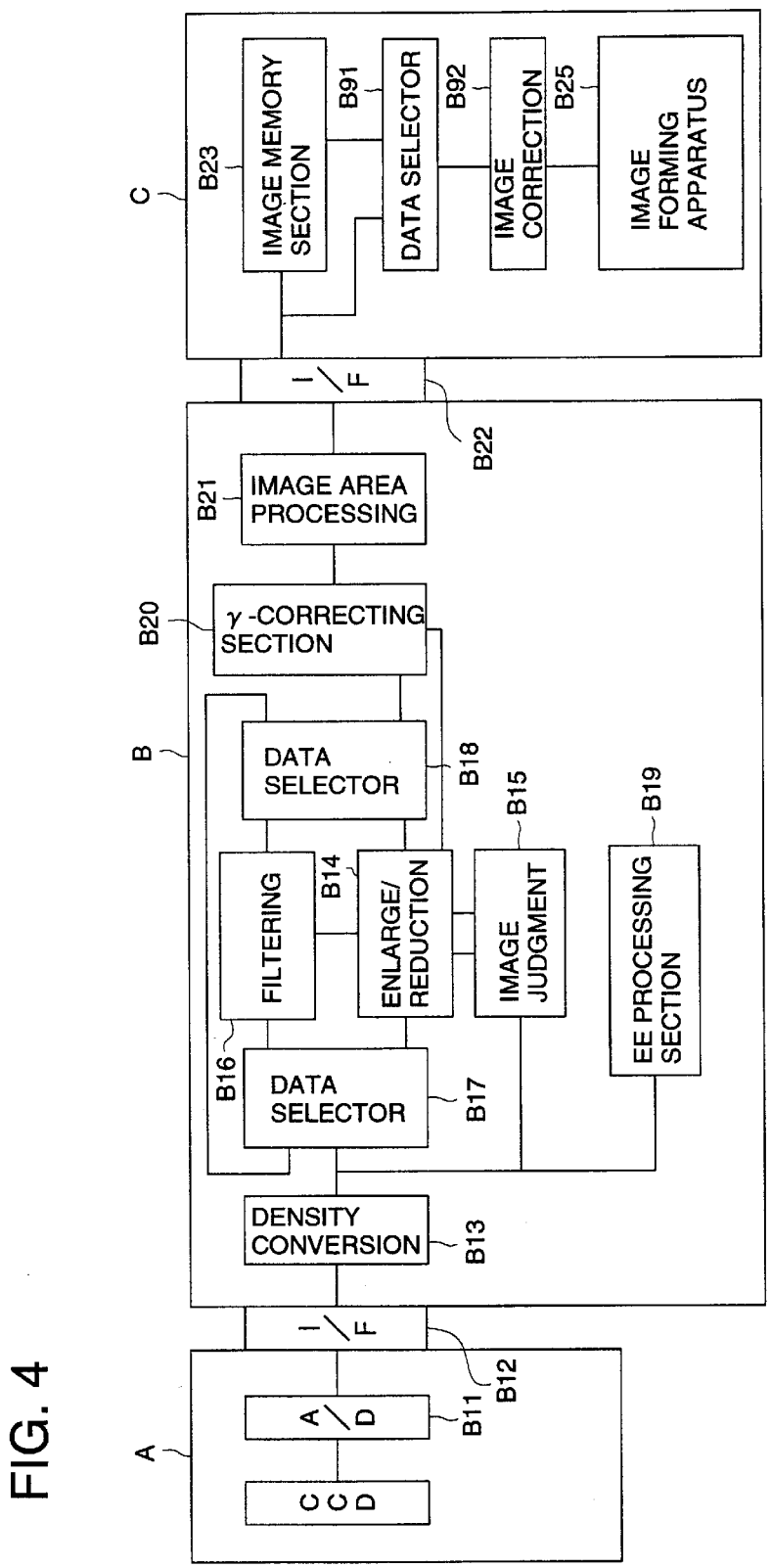
FIG. 4 is a block diagram showing the circuit structure.

Herein, according to the block diagram of FIG. 4, the circuit structure of the color image forming apparatus composed of the image reading section A, image processing section B and image forming section C, will be described below.

Initially, in the image reading section A, the analog image signal of 3 colors outputted from the image pick-up element CCD, is converted into the digital image signal (image data) by the A/D converter B11, and outputted to the image processing section B through an interface B12.

The digital image signal (brightness information) inputted into the image processing section B is, initially, converted into the density information by a density converter B13.

Then, the variable magnification processing according to the variable magnification designation of the user is conducted in a magnification/reduction processing section B14. Further, in an image discrimination processing section B15, the character image/picture image is discriminated according to the density information converted in the density conversion section B13, and according to the discrimination result, the filtering characteristic in a filtering processing section B16 is set, and in the filtering processing section B16, the space filtering processing is conducted according to the setting.

Incidentally, the image discrimination processing section B15 corresponds to the image discrimination means and processing characteristic changing means in the present embodiment, and the discrimination of the character image/picture image includes the discrimination of the character image area and the picture image area in the mixed image of the character image and the picture image.

Herein, corresponding to the designation of the magnification/reduction, in order to replace the filtering processing with the variable magnification processing, and conduct it, a pair of data selector B17 and B18 are provided. The replacement of the filtering processing with the variable magnification processing, is conducted to prevent the moire of the halftone image which appears in the image at the time of the reduction processing.

On the one hand, in an EE processing section B19, in order to obtain the feature of the document image from the image information obtained by the pre-scanning before the primary scanning, the histogram data is obtained. Then, the CPU of the image processing system, not shown, presents the proper γ-correction data to a γ-correcting section B20, according to the histogram data.

The image data (density information) on which the filtering processing/variable magnification processing are conducted, is outputted to an image area processing section B21, after the γ-correction processing corresponding to the characteristic of an image forming apparatus B25, which will be described later, is conducted in the γ-correction processing section B20. In the image area processing section B21, the area processing such as the frame erasing, and fold erasing is also conducted other than the extraction of the effective image area of the document.

As described above, all the image processing necessary for the image formation is conducted, and the image data (density information) which is in the final output condition to the image forming apparatus, which will be described later, is outputted to the image forming section C through an interface B22.

The image forming section C has: together with a function to conduct the image formation on the photoreceptor drum 10 at real time in the document reading, a data selector B92 in which the plurality of the inputted image data are stored, and from which the stored image data is arbitrarily read out later; an image correction processing section B92 to conduct the image correction for the front/rear image data; and a function to conduct the image formation according to the corrected image data.

Herein, in the present embodiment, the function by which the image data which is obtained by reading the document image and on which the necessary image processing is entirely conducted, is stored, and the stored image data is selectively read out later, and the image formation is conducted, is called an electronic RDH.

The image forming section C is provided with: other than the image forming apparatus B25 which is a laser printer, an image storing section B23 (image data storing means) for storing the image data to be re-writable so that the electronic RDH function is realized; a data selector B91 to switch the electronic RDH function to the ordinary real time image forming function, and to allot the front side and the rear side image data; and the image correction processing section B92 for conducting the image correction corresponding to the front/rear side.

The data selector B91 selectively outputs either one of the image data read from the image storing section B23 or the image data successively outputted form the image processing section B corresponding to the reading, to the image forming apparatus (laser printer)B25.

That is, in the image storing section B23, the same image data in the final output condition as in the ordinary real time processing is stored, and the image data from the image processing section B selectively outputted by the data selector B91, and the image data read from the image storing section B23 are equally processed in the image forming apparatus B25, and the image formation can be conducted.

In the image forming apparatus of the present invention, two times transferring which are the transferring from the image carrier onto a toner image receiving body, and the transferring from the toner image receiving body onto the recording sheet, are conducted on the rear side image. On the one hand, one time transferring from the image carrier onto the recording sheet is conducted on the front side image. In these transferring, because the toner adhering amount is lowered by about 10% for each time, when the image processing is conducted in the same condition, the image density of the rear side image is lower than that of the front side image. Further, in the rear side image, by the scattering of the toner image due to the two times transferring, the gradation property changes. In the case of the halftone dot image, the halftone dot is spread, and generally, there is a tendency that γ is increased. Further, in the color image, because the order of superimposition of the toner image is reversed on the recording sheet, the image tone is changed. The UCR amount is found from a mixed ratio, and in the rear side image, because K layer is the uppermost layer and there is a tendency that the black (K) is too much emphasized, in the front side image and the rear side image, it is necessary that the UCR amount is changed in the case of the color reproduction.

Figure 5:
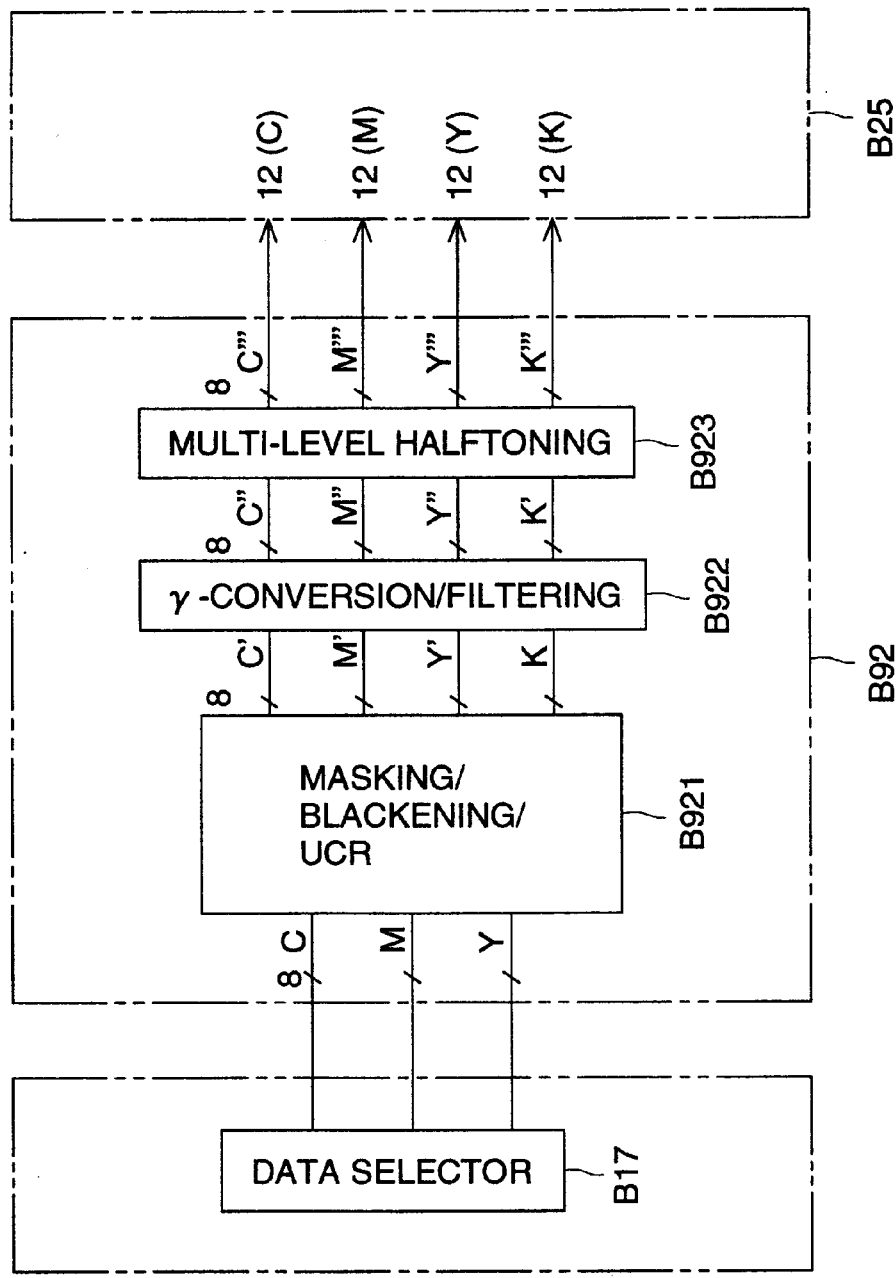
FIG. 5 is a block diagram showing the circuit structure of the image correction processing.
Figures 11A, 11B, 11C:
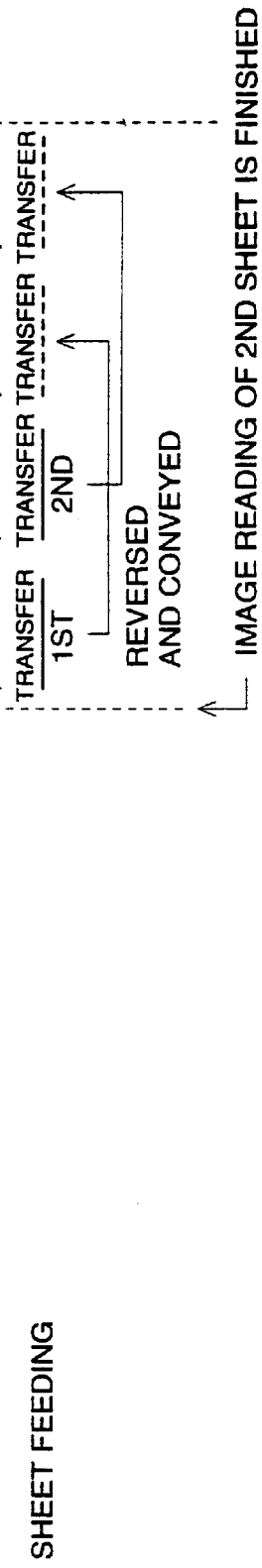
FIG. 11(a) to FIG. 11(c) are illustrations showing the relationship among the image reading, image writing, and sheet feeding of the comparative example.
Figure 13:
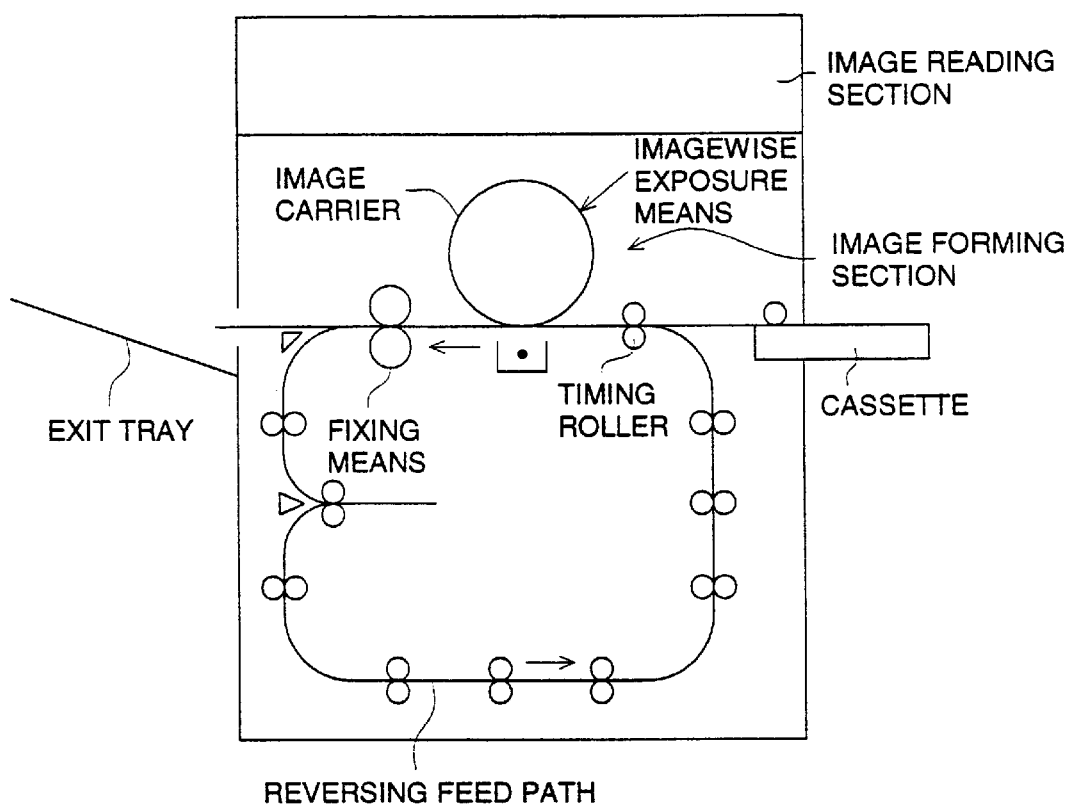
FIG. 13 is a conceptual view of an image forming apparatus used in the comparative example.

In the present embodiment, as shown in FIG. 5, in the color processing B921 of the image correction processing B92, the processing including the color processing such as masking, inking, and UCR, is conducted. As the masking, the generally conducting linear masking, or in the case of the color correction of the high grade, non-linear masking, or the masking using the look-up table, is used. Parameters for the masking for the color correction, are respectively set previously for the front side image and the rear side image, and the change of the setting of the parameters is conducted corresponding to the front side image or the rear side image. Such the color processing B921 and the γ-conversion and filtering processing B922 are conducted, and through the multi-level half toning such as the screening, dither, or error scattering, the output to the exposure unit 12 for each color of Y, M, C, and K, is conducted. Such the image correction processing B92 is conducted, and double side images whose color density or color tone is arranged, are formed. Because two times transfer processes are conducted on the rear side image, γ is easily increased for the rear side image, and the resolution is also easily lowered. The function for correcting this, is provided.

Incidentally, in the case of the monochromatic image, the color correction is not necessary, and the γ-correction, filtering processing and density correction may be conducted only on the rear side image, and in the case where the maximum density of black is the saturated image density, when the change of the setting is made only for the γ-correction and filtering processing, the double side image in which no difference is noticed between the front and rear sides, can be obtained.

Further, in the above description, the mirror image conversion processing of the image data is conducted in the data selector B91, however, the circuit structure in which the mirror image conversion is included in the parameter whose setting is changed corresponding to the front side or the rear side in the image correction processing B92, may also be possible.

In the present invention, after the initial document reading in the image reading section A is conducted and the image data is transmitted, or after the transmission of the image data by the outside input is confirmed, the feeding of the transfer material to the transfer area is started, and before the feeding of the transfer material, the rear side image is formed on the intermediate transfer belt by the transferring from the image forming body, and simultaneously with the feeding of the transfer material, the front side image is formed on the image forming body. According to this, the printing time at the time of double sided image formation is reduced, and when the reading miss in the image reading section A occurs, the feeding jam is prevented from generating.

An example will be described below.

EXAMPLE 1

A case in which A-3 sized double sided images are formed by the image forming apparatus having the capacity enough to transfer one page of the A-3 sized image onto the intermediate transfer body 14*a*, will be described below. FIGS. 6(*a*)–6(*d*) are illustrations showing the relationship among the reading of the document image (FIG. 6(*a*)) in the image reading section A in the present example, the writing of the image (FIG. 6(*b*)) by the exposure unit 12, and the sheet feeding (FIG. 6(*d*)) by the timing roller 15*c*. As described before using the block diagram in FIG. 4, in the image reading section A, when the start button to conduct the image recording, is ON, the image reading is started. When double sided images are read, the image is read in the order of the front side (hereinafter, it will be described also 1-front) of the first sheet of the document, the rear side (hereinafter, it will be described also 1-rear) of the first sheet of the document, 2-front, 2-rear, 3-front, 3-rear, . . . . Further, when the single-sided (front side) document is read, the image is read in the order of page 1, page 2, page 3, page 4, . . . . After the successively read out image data is image processed in the image processing section B, the image data is outputted to the image forming section C through the interface B12. In the present example, the first read (1-front) image is stored in the image storing section B23. After the following (1-rear) image is mirror image processed in the data selector B91, and image processed corresponding to the front/rear in the image correction processing B92, the exposure is conducted at real time on the photoreceptor drum 10 in timed relationship with the reading of the document image, and image is formed. Further, the (1-rear) image is stored in the image storing section B23 simultaneously with the real time writing. As described above, while the front/rear image of the document of the first sheet which is initially image-recorded, is read out, the feeding of the transfer sheet is not conducted.

Next to the reading of the (1-rear) image, the reading of the (2-front) image is conducted, and the read out (2-front) image is stored in the image storing section B23. In this manner, while the reading of the (2-front) image is conducted, the (1-front) image is read from the image storing section B23 in timed relationship with the (1-rear) image on the intermediate transfer body 14*a* shown in FIG. 6(*c*), and the image is formed on the photoreceptor drum 10. Further, the feeding of the first sheet of the transfer material is started in timed relationship with the writing of the (1-front) image onto the photoreceptor drum 10.

Because double sided image formation is conducted in this process, in the case where the transmission trouble of the image data caused by the jam of document is generated before the start of the feeding of the transfer material, the feeding of the transfer sheet is prohibited, and cleaning of the intermediate transfer body 14*a* and the photoreceptor drum 10 is conducted. Further, when such transmission trouble of the image data is generated after the start of the feeding of the transfer material, the image forming process for the sheet on the way of feeding is conducted and the sheet is discharged. Then, the apparatus is stopped. After a solution of the trouble the transmission of the image data is re-started and image forming process is started and image forming process is started.

When the image formation is conducted on double sides of the transfer material according to the sequence described above, the printing time is not delayed uselessly, and the transfer sheet feeding jam is prevented even if the trouble such as the conveyance trouble of the document which is generated at the period of the image reading is occurred, thereby, greatly effective image processing is conducted.

EXAMPLE 2

In the same manner as described in Example 1, a case in which A-3 sized double sided images are formed by the image forming apparatus having the capacity enough to transfer one page of the A-3 sized image onto the intermediate transfer body 14*a*, will be described below. In the present example, the different point from Example 1 is that, in Example 1, the transfer of the image data by the transfer means to transfer the image data in the order of the page is conducted in timed relationship with the writing by the writing means according to the image data at real time, however, in contrast to this, in the present example, it is conducted a synchronously.

FIGS. 7(*a*)–7(*d*) are illustrations showing the relationship among the reading of the document image (FIG. 7(*a*)) in the image reading section A in the present example, the writing of the image (FIG. 7(*b*)) by the exposure unit 12, and the sheet feeding (FIG. 7(*d*)) by the timing roller 15*c*. As described previously using the block diagram in FIG. 4, in the image reading section A, when the start button to conduct the image recording, is ON, the image reading is started. When double sided images are read, the image is read in the order of the front side (hereinafter, it will be described also 1-front) of the first sheet of the document, the rear side (hereinafter, it will be described also 1-rear) of the first sheet of the document, 2-front, 2-rear, 3-front, 3-rear, . . . . Further, when the single-sided (front side) document is read, the image is read in the order of page 1, page 2, page 3, page 4, . . . . After the successively read out image data is image processed in the image processing section B, the image data is outputted to the image forming section C through the interface B12. In the present example, the read out image data are stored in the image storing section 23 in the order of (1-front) image, (1-rear) image, (2-front) image, . . . . When the input of the (1-front) image and (1-rear) image corresponding to the first sheet is completed, the image data of the (1-rear) image is read out, and mirror image processed by the data selector B91, and after the image processing corresponding to the front/rear is conducted in the image correction processing B92, the image exposure onto the photoreceptor drum 10 is conducted and the image is formed, and the (1-rear) image on the photoreceptor drum 10 is transferred onto the intermediate transfer body 14*a*. In this manner, while the front/rear image of the document of the first sheet onto which, initially, the image recording is conducted, is read out, the feeding of the transfer sheet is not conducted.

Next to the reading of the (1-rear) image, the reading of the (2-front) image is conducted, and the read out (2-front) image is stored in the image storing section B23. In this manner, while the reading of the (2-front) image is conducted, the (1-front) image is read from the image storing section B23 in timed relationship with the (1-rear) image on the intermediate transfer body. 14*a* shown in FIG. 7(*c*), and the image is formed on the photoreceptor drum 10. Further, the feeding of the first sheet of the transfer material is started in timed relationship with the writing of the (1-front) image onto the photoreceptor drum 10.

Because double sided image formation is conducted in this process, in the case where the transmission trouble of the image data caused by the jam of document is generated before the start of the feeding of the transfer material, the feeding of the transfer sheet is prohibited, and cleaning of the intermediate transfer body 14a and the photoreceptor drum 10 is conducted. Further, when such transmission trouble of the image data is generated after the start of the feeding of the transfer material, the image forming process for the sheet on the way of feeding is conducted and the sheet is discharged. Then, the apparatus is stopped. After a solution of the trouble the transmission of the image data is re-started and image forming process is started and image forming process is started.

When the image formation is conducted on double sides of the transfer material according to the sequence described above, the printing time is not delayed uselessly, and the transfer sheet feeding jam is prevented even if the trouble such as the conveyance trouble of the document which is generated at the period of the image reading is occurred, thereby, greatly effective image processing is conducted.

EXAMPLE 3

A case in which A-4 sized double sided images are formed by the image forming apparatus having the capacity enough to transfer the A-4 sized image for two pages onto the intermediate transfer body 14a, will be described below. FIGS. 8(a)–8(d) are illustrations showing the relationship among the reading of the document image (FIG. 8(a)) in the image reading section A in the present example, the writing of the image (FIG. 8(b)) by the exposure unit 12, and the sheet feeding (FIG. 8(d)) by the timing roller 15c. As described previously using the block diagram in FIG. 4, in the image reading section A, when the start button to conduct the image recording, is ON, the image reading is started. When double sided images are read, the image is read in the order of the front side (hereinafter, it will be described also 1-front) of the first sheet of the document, the rear side (hereinafter, it will be described also 1-rear) of the first sheet of the document, 2-front, 2-rear, 3-front, 3-rear, . . . . Further, when the single-sided (front side) document is read, the image is read in the order of page 1, page 2, page 3, page 4, . . . . After the successively read out image data is image processed in the image processing section B, the image data is outputted to the image forming section C through the interface B12. In the present example, the initially read out (1-front) image, (1-rear) image, and (2-front) images are stored in the image storing section B23. However, the (1-rear) image is read out at a predetermined previous time to the leading timing of the (2-rear) image outputted next, and mirror image processed in the data selector B91, and image processed corresponding to the front/rear in the image correction processing B92, and the image is formed on the photoreceptor drum 10. After the following (2-rear) image is mirror image processed in the data selector B91, and image processed corresponding to the front/rear in the image correction processing B92, the image formation is conducted at real time on the photoreceptor drum 10 in timed relationship with the reading of the document image. Further, the (2-rear) image is stored in the image storing section B23 simultaneously with the real time writing. As described above, while the front/rear image of the document of the first sheet and the second sheet on which initially the image-recording is conducted as the same group, is read out, the feeding of the transfer sheet is not conducted.

Next to the reading of the (2-rear) image, the reading of the (3-front) image is conducted, and the read out (3-front) image is stored in the image storing section B23. In this manner, while the reading of the (3-front) image is conducted, the (1-front) image is read from the image storing section B23 in timed relationship with the (1-rear) image on the intermediate transfer body 14a shown in FIG. 8(c), and further, the (2-front) image is read in timed relationship with the (2-rear) image on the intermediate transfer body 14a, and the image is formed on the photoreceptor drum 10. Then, the feeding of the first sheet of the transfer material is started in timed relationship with the writing of the (1-front) image onto the photoreceptor drum 10, and the feeding of the second sheet of the transfer material is started in timed relationship with the writing of the (2-front) image onto the photoreceptor drum 10.

Because double sided image formation is conducted in this process, in the case where the transmission trouble of the image data caused by the jam of document is generated before the start of the feeding of the transfer material, the feeding of the transfer sheet is prohibited, and cleaning of the intermediate transfer body 14a and the photoreceptor drum 10 is conducted. Further, when such transmission trouble of the image data is generated after the start of the feeding of the transfer material, the image forming process for the sheet on the way of feeding is conducted and the sheet is discharged. Then, the apparatus is stopped. After a solution of the trouble the transmission of the image data is re-started and image forming process is started and image forming process is started.

When the image formation is conducted on double sides of the transfer material according to the sequence described above, the printing time is not delayed uselessly, and the transfer sheet feeding jam is prevented even if the trouble such as the conveyance trouble of the document which is generated at the period of the image reading is occurred, thereby, greatly effective image processing is conducted.

EXAMPLE 4

In the same manner as described in Example 3, a case in which A-4 sized double sided image are formed by the image forming apparatus having the capacity enough to transfer the A-4 sized image for two pages onto the intermediate transfer body 14a, will be described below. In the present example, the different point from Example 3 is that, in Example 3, the transfer of the image data by the transfer means to transfer the image data in the order of the page is conducted in timed relationship with the writing by the writing means according to the image data at real time, however, in contrast to this, in the present example, it is conducted asynchronously in the present example. FIGS. 9(a)–9(d) are illustrations showing the relationship among the reading of the document image (FIG. 9(a)) in the image reading section A in the present example, the writing of the image (FIG. 9(b)) by the exposure unit 12, and the sheet feeding (FIG. 9(d)) by the timing roller 15c. As described previously using the block diagram in FIG. 4, in the image reading section A, when the start button to conduct the image recording, is ON, the image reading is started. When double sided images are read, the image is read in the order of the front side (hereinafter, it will be described also 1-front) of the first sheet of the document, the rear side (hereinafter, it will be described also 1-rear) of the first sheet of the document, 2-front, 2-rear, 3-front, 3-rear, . . . . Further, when the single-sided (front side) document is read, the image is read in the order of page 1, page 2, page 3, page 4, . . . . After the successively read out image data is image processed in the image processing section B, the image data is outputted to the image forming section C through the interface B12. In the present example, the read out image data are stored in the image storing section B23 in the order of (1-front) image, (1-rear) image, and (2-front) image, .... When the input of the (1-front) image and the (1-rear) image corresponding to the first sheet, and the (2-front) image of the second sheet into the image storing section B23 is completed, the image data of the (1-rear) image is read out during the input of (2-rear) image, and is mirror image processed in the data selector B91, and image processed corresponding to the front/rear in the image correction processing B92, after that, the image exposure is conducted onto the photoreceptor drum 10, and image formation is conducted.

In the present example, the (2-rear) image is read from the image storing section 23 with a predetermined time interval from the (1-rear) image, asynchronously with the reading of the document image, and is mirror image processed and image processed, and the image exposure is conducted onto the photoreceptor drum 10. The (1-rear) image formed on the photoreceptor drum 10 and the next (2-rear) image are transferred onto the intermediate transfer body 14a as a group.

From the image storing section 23, next to the (2-rear) image, as shown in FIG. 9(c), the (1-front) image is read out in timed relationship with the (1-rear) image on the intermediate transfer body 14a, and the (2-front) image is read out in timed relationship with the (2-rear) image, and the image formation on the photoreceptor drum 10 is conducted. The feeding of the transfer material of the first sheet is started in timed relationship with the writing of the (1-front) image onto the photoreceptor drum 10, and the feeding of the transfer material of the second sheet is started in timed relationship with the writing of the (2-front) image onto the photoreceptor drum 10.

Because double sided image formation is conducted in this process, in the case where the transmission trouble of the image data caused by the jam of document is generated before the start of the feeding of the transfer material, the feeding of the transfer sheet is prohibited, and cleaning of the intermediate transfer body 14a and the photoreceptor drum 10 is conducted. Further, when such transmission trouble of the image data is generated after the start of the feeding of the transfer material, the image forming process for the sheet on the way of feeding is conducted and the sheet is discharged. Then, the apparatus is stopped. After a solution of the trouble the transmission of the image data is re-started and image forming process is started and image forming process is started.

When the image formation is conducted on double sides of the transfer material according to the sequence described above, the printing time is not delayed uselessly, and the transfer sheet feeding jam is prevented even if the trouble such as the conveyance trouble of the document which is generated at the period of the image reading is occurred, thereby, greatly effective image processing is conducted.

EXAMPLE 5

The image forming apparatus in the present example is one wherein when intermediate transfer body (14a) is capable of holding images of n sheets, control is conducted so that writing of image data through intermediate transfer body 14a is started after image data of pages less than n pages have been transmitted first, and transfer material feeding is started after the writing of image data through intermediate transfer body 14a has been finished, in relationship of transmission of image data by a transmission means which transmits image data in the order of pages, writing by a writing means based on image data and of feeding of a transfer material, and in the image forming apparatus, an ordinary sequence is started after a double sided image copy for the first sheet has been made on priority basis.

The image forming apparatus in the present example is an image forming apparatus having capacity to transfer images in A4 size equivalent to two pages onto intermediate transfer body 14a. An occasion to form double sided images in A4 size will be explained below.

In the present example explained below, with regard to image data for page 1, page 2, page 3, ..., of a single sided document read in the order of pages, images on the first page of the document (hereinafter referred to also as 1P) are transferred twice and are formed on the rear side of recording sheet P, while, images on 2P are transferred once and are formed on the front side of recording sheet P. In the present example, therefore, recording sheet P on which fixing of double sided images by fixing unit 30 has been completed advances straight, passing through a conveyance path shown with chain lines and is conveyed by sheet ejection roller 18A to be ejected on tray 18B located outside the apparatus, in the image forming apparatus shown in FIG. 1. When double sided copies are made on multiple sheets, recording sheets P are stacked on the tray 18B on which a sheet is ejected after advancing straight, in a form wherein sheets are read in the order of pages.

Each of FIGS. 10(a)–10(j) represents relationship for reading of document images in image reading section A, image writing by exposure unit 12 and for sheet feeding by timing roller 15c, and it is an illustration showing the state of double sided images on the ejected recording sheet P. Each of FIGS. 10(a)–10(e) represents a sequence showing how to make double sided copies (one set) from single sided document (2 sheets) or from double sided document (1 sheet), while, each of FIGS. 10(f)–10(j) represents a sequence showing how to make double sided copies (one set) from single sided document (10 sheets) or from double sided document (5 sheets).

First, a sequence to make double sided copies (one set) from a double sided document (2 sheets) shown in each of FIGS. 10(a)–10(e) will be explained as follows. In image reading section A in a block diagram in FIG. 4, image reading is started when a start button for conducting image recording is turned on. When reading.a single sided (front side) document, document reading for page 1 is conducted and then document reading for page 2 is conducted. Image data obtained through reading are subjected to image processing in image processing section B, and then, are outputted to image forming section C through interface B22.

In the present example, image forming is started at the moment when document reading and image forming for the first page have been finished, namely, at the moment when image data for the first page have been assured. With regard to 1P image forming, the image forming is conducted after imagewise exposure is conducted on photoreceptor drum 10, after mirror image processing is carried out by data selector B91 and image processing corresponding to front/rear is conducted in image correction processing B92.

Following the 1P image reading, 2P image reading is conducted, and 2P images thus read are stored in image storage section B23. With regard to the start of imagewise exposure on photoreceptor drum 10 for 2P images, 2P images are called from image storage section B23 with a timing interval of (circumference of intermediate transfer body 14a)/(peripheral speed) from the start timing of imagewise exposure on photoreceptor drum 10 for 1P images, and then, the imagewise exposure is conducted. Due to the control of timing for writing, 1P images on intermediate transfer body 14a are made to accord with 2P images on photoreceptor drum 10 in terms of a period. Recording sheet P is also made to accord in terms of a period in the same way for sheet feeding by timing roller 15c, and at the start of sheet feeding, image data for the second page are already assured. Image forming is conducted under the condition that 2P images are held on the front side (upper side) of recording sheet P and 1P images are held on the rear side (bottom side) of recording sheet P.

Since writing is started in the course of reading of document images equivalent to two pages, in the present example, a period of time from the moment when the start button is turned on to the moment when the processed recording sheet P is ejected out is short, and one set of double sided copies are ejected on tray 18B at the moment corresponding to the second sheet in single sided copy.

Next, there will be explained a sequence in which double sided copies (one set) are made from a single sided document (10 sheets) shown in FIGS. 10(f)–10(j). In image reading section A in a block diagram shown in FIG. 4, image reading is started when a start button for image recording is turned on. When reading a single sided (front surface) document, the reading is conducted in the order of pages of page 1, page 2, page 3, . . . , page 9 and page 10. Image data obtained through successive reading are subjected to image processing in image processing section B, and then, are outputted to image forming section C through interface B22.

In the present example, double sided copying of 1P images and 2P images for the first sheet is given priority, and then, an ordinary sequence is started. Operations up to output of double sided copies of 1P images and 2P images are conducted in the same way as in the explanation given by the use of FIGS. 10(a)–10(e). Namely, image forming is started immediately after document reading for the first page. With regard to formation of 1P images, mirror image processing is conducted by data selector B91, then, image processing corresponding to front/rear is conducted by image correction processing B92, and imagewise exposure is conducted on photoreceptor drum 10 so that image forming may be carried out.

Following the reading of 1P images, operations of image reading for 2P, 3P and 4P are conducted, and images for 2P, 3P and 4P thus read are stored in image storage section B23. Since it is possible for intermediate transfer body 14a to hold thereon images equivalent to two pages in A4 size, if 1P images and 3P images are formed side by side on the belt, double sided copies for each two sheets of (1P+2P) and (3P+4P) are outputted. However, since it is impossible for the reading of 3P images to be in time of the writing of 3P images, 2P images are called from image storage section B23 under the condition that the intermediate transfer body 14a has thereon 1P images only to leave an open space as it is, for the first image forming, and then, imagewise exposure is conducted at the moment when a prescribed period of time has passed from the imagewise exposure for 1P images. Being synchronized under the condition that image data for the second page are assured, sheet feeding for the first recording sheet P is conducted, and image forming is conducted in the form that 2P images are held on the front surface (upper surface) of the first recording sheet P and 1P images are held on the rear side (bottom surface).

Following the foregoing, an ordinary sequence is started and image forming is conducted. Namely, 3P images and 5P images are called in succession from image storage section B23 at a prescribed shot time interval, then, mirror image processing is conducted by data selector B91, image processing corresponding to front/rear is conducted by image correction processing B92, and imagewise exposure is conducted on photoreceptor drum 10 so that image forming may be carried out.

Images for 3P and 5P are transferred onto intermediate transfer body 14a from photoreceptor drum 10, and thus, 3P images and 5P images are formed side by side on the circumferential surface of intermediate transfer body 14a. Following the images for 3P and 5P, 4P images and 6P images are called from image storage section B23, and image forming therefor is conducted in synchronization with the images for 3P and 5P on the intermediate transfer body 14a, then, 4P images and 6P images are transferred respectively onto the rear surface of the second recording sheet P and the rear surface of the third recording sheet P both fed in synchronization, and 3P images and 5P images are further transferred respectively onto the front surfaces thereof, thus, the second recording sheet P having 4P images and 3P images respectively on its rear surface and front surface and the third recording sheet P having 6P images and 5P images respectively on its rear surface and front surface are outputted in succession.

In the same way, 8P images are held on the rear surface and 7P images are held on the front surface both of fourth recording sheet P, while, 10P images are held on the rear surface and 9P images are held on the front surface both of the succeeding fifth recording sheet, so that both recording sheets are ejected on tray 18B.

Even in the present example, double sided copy for the first sheet is ejected within a short period of time. In the present example, the sequence is especially advantageous when the number of sheets for double sided copy to be ejected is an odd number.

According to the present invention, the printing time is not delayed uselessly, and the sheet (transfer material) feed jamming does not occur also for the miss such as the conveyance trouble of the image data which is easily generated at the initial period of the image reading, thereby, greatly effective image processing is conducted.

What is claimed is:

1. An image forming apparatus in which toner images formed on an image forming body are formed on both sides of a transfer material, the image forming apparatus comprising:

(a) reading means for reading image data of original documents;

(b) writing means for writing an image on the image forming body according to the image data;

(c) feeding means for feeding the transfer material; and (d) an intermediate transfer body, wherein the writing means writes an image for the intermediate transfer body before the feeding means starts to feed the transfer material, and wherein when a reading trouble of the image data is caused before the feeding means starts to feed the transfer material, the intermediate transfer body and the image forming body are cleaned, and a feed of a following transfer material is stopped.

2. The image forming apparatus of claim 1, wherein when the reading trouble of the image data is caused after the feeding means starts to feed the transfer material, the transfer material is discharged from the apparatus, and the feed of the following transfer material is stopped.

3. An image forming apparatus in which toner images formed on an image forming body are formed on both sides of a transfer material, the image forming apparatus comprising:
- (a) reading means for obtaining image data by reading original documents in page order;
- (b) image processing means for image processing the obtained image data;
- (c) an image forming body;
- (d) writing means for forming an electrostatic latent image on the image forming body based on the processed image data;
- (e) a developing device for developing the latent image formed on the image forming body to form a toner image;
- (f) an intermediate transfer body;
- (g) feeding means for feeding the transfer material;
- (h) first transfer means for transferring toner images formed on the image forming body onto one of the intermediate transfer body and a front side of the transfer material; and
- (i) second transfer means for transferring toner images from the intermediate transfer body onto a back side of the transfer material,
  - wherein before image data corresponding to both sides of the transfer material is obtained, and before the feeding means starts to feed the transfer material, the writing means starts to write an image onto the image forming body based on processed image data corresponding to the back side of the transfer material.

4. The image forming apparatus of claim 3, wherein when a reading trouble of the image data is caused before the feeding means starts to feed the transfer material, the intermediate transfer body and the image forming body are cleaned, and a feed of the transfer material is stopped.

5. The image forming apparatus of claim 4, wherein when a reading trouble of the image data with respect to a following transfer material is caused after the feeding means starts to feed the transfer material, the transfer material is normally discharged from the apparatus, and a feed of the following transfer material is stopped.

6. An image forming apparatus in which toner images formed on an image forming body are formed on both sides of a transfer material, the image forming apparatus comprising:
- (a) reading means for obtaining image data by reading original documents in page order;
- (b) image processing means for image processing the obtained image data;
- (c) an image forming body;
- (d) writing means for forming an electrostatic latent image on the image forming body based on the processed image data;
- (e) a developing device for developing the latent image formed on the image forming body to form a toner image;
- (f) an intermediate transfer body;
- (g) feeding means for feeding the transfer material;
- (h) first transfer means for transferring toner images formed on the image forming body onto one of the intermediate transfer body and a front side of the transfer material; and
- (i) second transfer means for transferring toner images from the intermediate transfer body onto a back side of the transfer material,
  - wherein when n toner images corresponding to back sides of n sheets of the transfer material can be accommodated on the intermediate transfer body, the writing means starts to write image data corresponding to a back side of an n-th sheet before the reading means finishes reading image data corresponding to both sides of the n-th sheet, and the feeding means starts to feed the n-th sheet of the transfer material after the reading means finishes reading the image data corresponding to both sides of the n-th sheet.

* * * * *